June 24, 1930.  H. W. KING  1,766,129
LIQUID DEPTH INDICATING DEVICE
Filed Nov. 13, 1922
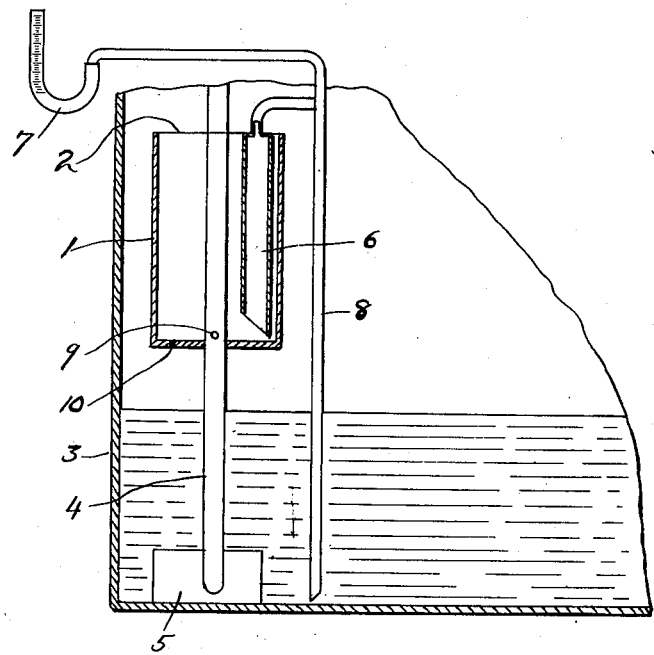
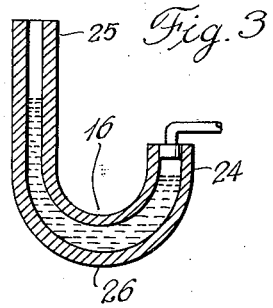
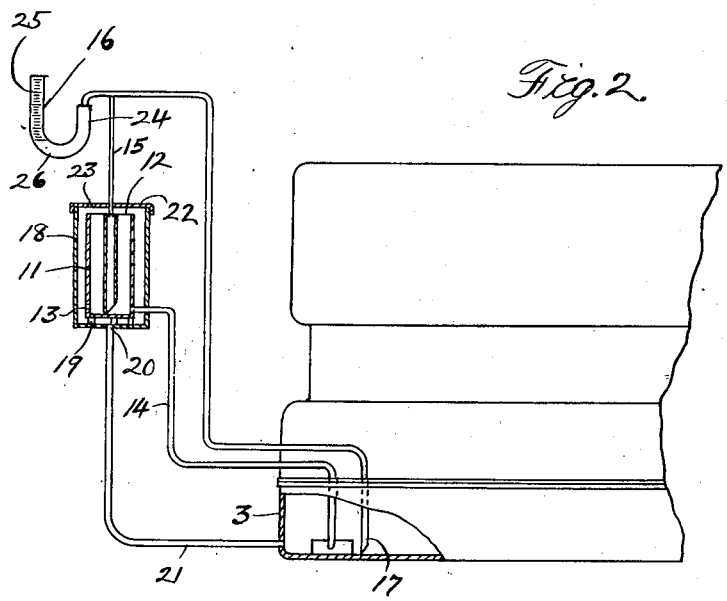
Inventor
Horace W. King.
Attorneys Patented June 24, 1930

1,766,129

UNITED STATES PATENT OFFICE

HORACE W. KING, OF ANN ARBOR, MICHIGAN, ASSIGNOR TO KING-SEELEY CORPORATION, OF ANN ARBOR, MICHIGAN, A CORPORATION OF MICHIGAN

LIQUID-DEPTH-INDICATING DEVICE

Application filed November 13, 1922. Serial No. 600,513.

The invention relates to liquid depth indicating devices and has for one of its objects the provision of a simple device which is dependent upon the flow of the liquid for indicating the depth of the same. Another object is the provision of a device, which may be compactly arranged, for producing an air pressure sufficient to displace the liquid within the measuring tube located in the body of the liquid to a predetermined level. Other objects of the invention reside in the novel features of construction and combinations and arrangements of parts as more fully hereinafter set forth.

In the drawings:

Figure 1 is a sectional elevation of a portion of an internal combustion engine with a liquid depth indicating device embodying my invention applied;

Figure 2 is a sectional elevation of an internal combustion engine with a modified construction of liquid depth indicating device applied.

Figure 3 is a sectional elevation of the pressure gage.

In the present instance, the devices embodying my invention are employed to indicate the depth of the lubricating oil in the crank case of an internal combustion engine, but it is evident that these devices may be employed for measuring other liquids.

As shown in Figure 1, 1 is a vertically extending receptacle having an open upper end 2 and located within the crank case 3 of an internal combustion engine. This receptacle is mounted upon and preferably concentric with the vertically extending oil discharge conduit 4 leading from the oil pump 5, which is also within the crank case, the receptacle being located preferably above the level of the oil surface. 6 is a vertically extending tube within the receptacle 1 and having an open lower end communicating with the receptacle near the lower end of the latter. 7 is a suitable pressure gage communicating with the chamber formed by the tube 6, and 8 is a vertically extending measuring tube having a lower open end communicating with the crank case near its lower end, this tube forming a chamber communicating with the chamber formed by the tube 6. The volume inclosed within the tube 6 and up to the level of the upper open end 2 of the receptacle 1 is preferably greater than the volume inclosed within the tube 8 from the normal level of the oil in the crank case down to the lower open end of the tube.

The discharge conduit 4 is provided with the opening 9 which has a small area relative to the cross sectional area of the conduit 4 so as to not greatly reduce the amount of oil flowing through the conduit. This opening leads into the receptacle 1 preferably near its lower end, whereby upon operation of the oil pump which is preferably driven from the internal combustion engine (not shown), oil is fed into the receptacle 1 filling the same as well as the tube 6, thereby displacing the air in the tube 6 which in turn displaces the oil in the tube 8. Excess oil flows over the upper edge of the receptacle back into the body of oil in the crank case. The pressure of this air is indicated upon the gage 7 which may be suitably calibrated to indicate either the depth, or quantity, or both of the lubricating oil in the crank case. It should be stated that the amount of displacement of liquid in tube 8 will be governed by the hydrostatic head of the liquid in receptacle 1 and that the height of this receptacle should be such that it will at all times be greater than the maximum height of oil in the crank case.

For the purpose of replenishing the chamber formed by the tube 6 with air so that the pressure gage will correctly indicate the depth or quantity of oil in the crank case, the receptacle 1 is provided with the restricted discharge opening 10 in its lower end, the area of this discharge opening being less than the area of the inlet opening 9. With this arrangement, the oil within the receptacle 1 and tube 6 drains therefrom through the discharge opening 10 upon the stopping of the engine and oil pump permitting air to enter the tube.

By reason of arranging the tube 6 within the receptacle 1 the size of the latter may be only such as to accommodate the discharge conduit 4 and tube 6 and to provide sufficient passage for all of the oil which flows into the receptacle and does not discharge through the restricted outlet 10. Consequently, the arrangement may be very compact.

In the modified construction shown in Figure 2, the arrangement is such that the depth indicating device may be readily attached to any internal combustion engine having a lubricating oil pump. In detail, 11 is an inner receptacle having an open upper end 12 and having at its lower end the restricted discharge opening 13 and also the inlet opening for the lubricating oil which is conducted from the oil pump through the discharge conduit 14. 15 is a vertically extending tube within the receptacle and having an open lower end adjacent to the lower end of the receptacle. 16 is a pressure gage communicating with the top of the tube 15, and 17 is a measuring tube extending into the crank case and having a lower open end adjacent to the bottom thereof, this pipe also communicating with the top of the tube 15. The volume inclosed within the tube 15 between its lower open end and the upper open end of the receptacle is preferably greater than the volume inclosed within the tube 17 between its lower open end and the normal level of the lubricating oil in the crank case, so that displacement of the air within the tube 15 compels displacement of the lubricating oil within the tube 17. The pressure of the displacing air being transferred to the pressure gage which is calibrated as desired to give either the depth or the quantity of the lubricating oil in the crank case or both.

18 is an outer receptacle inclosing the receptacle 11 which latter rests upon the bottom of the outer receptacle 18 and is spaced therefrom by the legs 19. This outer receptacle has the discharge opening 20 in its bottom through which the lubricating oil passing from the restricted opening 13 and over the upper edge of the inner receptacle 11 flows into the conduit 21 for conveying the lubricating oil back to the crank case. The outer receptacle preferably has the cover 22 which has the restricted aperture 23 for permitting of the entrance of air. This outer receptacle as well as the pressure gage are secured externally of the engine and preferably upon the dash of the motor vehicle. The measuring tube 17 may be readily inserted into the crank case and secured in place, and the conduits 14 and 21 may also be readily secured so that the depth indicating device forms a unit which is attachable to an internal combustion engine to measure the lubricating oil.

The operation of this depth indicating device is the same as that of the depth indicating device shown in Figure 1 with the exception that the lubricating oil flowing from the inner receptacle discharges into an outer receptacle and then flows through a conduit to the crank case.

The pressure gage shown in the present instance is a U-gage having one leg 24 with a passage therein of considerably greater area than that of the passage in the other leg 25, the passage in the base 26 of the gage gradually increasing in area toward the leg 24. With this arrangement upon stopping of the engine and consequently of the oil pump, the lubricating oil flows from the inner receptacle 11 and tube 15 and creates a suction within the tube 15 which is immediately transferred to the gage, lowering the level of the indicating liquid in the leg 25 of the gage and drawing air therethrough, thereby replenishing the tube 15 and intermediate connections with air.

What I claim as my invention is:

1. In a depth indicating device, the combination with a receptacle having a liquid discharge opening in its upper portion and a liquid discharge opening in its lower portion, of a chamber communicating with said receptacle near its lower end above the second-mentioned discharge opening and closed to the atmosphere at its upper end, a second chamber communicating with the liquid at the full depth to be measured and with said first-mentioned chamber at the top portion thereof, a pressure gage also communicating with the top portion of said first-mentioned chamber, and means for feeding the liquid into said receptacle.

2. In a depth indicating device, the combination with a receptacle having a liquid discharge opening in its upper portion, of an upwardly extending chamber communicating with said receptacle near its lower end and closed to the atmosphere at its upper end, a second chamber communicating with the liquid at the full depth to be measured and with said first-mentioned chamber at the top portion thereof, a pressure gage also communicating with the top portion of said first-mentioned chamber, means for feeding the liquid into said receptacle, and a liquid discharge outlet in said receptacle near its lower end and of smaller cross sectional area than said liquid inlet.

3. In a depth indicating device, the combination with a receptacle having a liquid discharge opening in its upper portion and a liquid discharge opening in its lower portion, of a chamber within said receptacle and communicating therewith near its lower end above the second-mentioned discharge opening and closed to the atmosphere at its upper end, a second chamber communicating with the liquid at the full depth to be measured and with said first-mentioned chamber at the top portion thereof, a pressure gage also communicating with the top portion of said first-mentioned chamber, and means for feeding the liquid into said receptacle, the arrangement being such that said first mentioned chamber will be automatically replenished with air.

4. The combination with an internal combustion engine having an oil pump communicating with its crank case, of a depth indicating device attachable as a unit and including a receptacle open at its top and having a discharge opening at its bottom, a chamber communicating with said receptacle near its lower end above the discharge opening and closed to the atmosphere at its upper end, a pressure gage communicating with said chamber at the top portion thereof, a second chamber insertable within the crank case and communicating with the oil therein at the full depth to be measured and also with said first-mentioned chamber at the top portion thereof, means for conducting oil from said pump to said first-mentioned chamber, the arrangement being such that said first mentioned chamber will be automatically replenished with air.

5. In a depth indicating device, the combination with an air chamber communicating with the liquid being measured at a pressure transmitting level, of a receptacle having an open upper end and a discharge opening near its lower end and adapted to intermittently receive some of the liquid being measured, a chamber within said receptacle having a closed upper end and communicating at its lower end with said receptacle above the discharge opening thereof, a pressure gauge, and means for placing said pressure gauge and said second chamber in communication with said air chamber.

6. The combination with an internal combustion engine and a lubricating oil pump communicating with its crank case, of a liquid depth indicating device forming an attachable unit, said device including means dependent upon the operation of said pump for measuring the lubricating oil in said crank case and comprising a receptacle open at its top and adapted to receive oil pumped from the crank case, said receptacle having a liquid discharge opening in its lower portion, a chamber within said receptacle open at its lower end above the discharge opening and closed to the atmosphere at its upper end and communicating with the oil in the crank case, and a pressure gage communicating with said chamber at its upper end.

7. The combination with an internal combustion engine having an oil pump communicating with its crank case, of a liquid depth indicating device attachable as a unit and including a chamber closed to the atmosphere at its upper end and open to the atmosphere below its upper end, a pressure gage communicating with said chamber at the top portion thereof, a second chamber insertable within the crank case and communicating with the oil therein at the full depth to be measured and also with the first mentioned chamber at the top portion thereof, means for conducting oil from said pump to said first mentioned chamber, and means providing for the removal of the oil from said first mentioned chamber to uncover its opening to the atmosphere.

In testimony whereof I affix my signature.
HORACE W. KING.